INVENTORS
A. B. GALVANONI
L. M. FARLEY
C. W. OSMOND

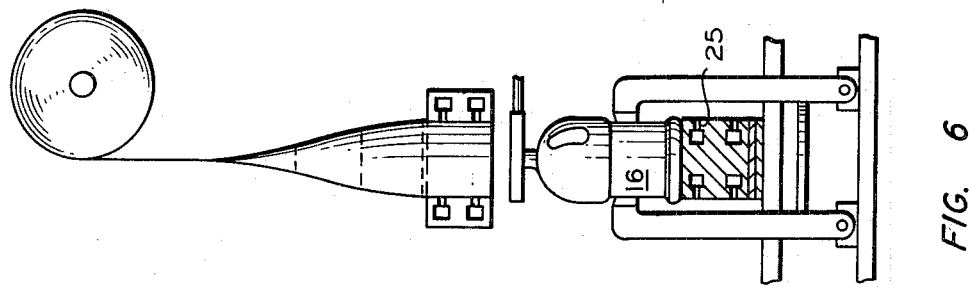
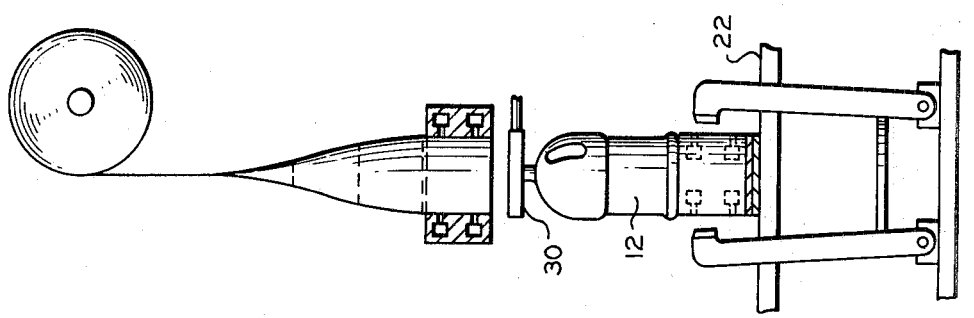
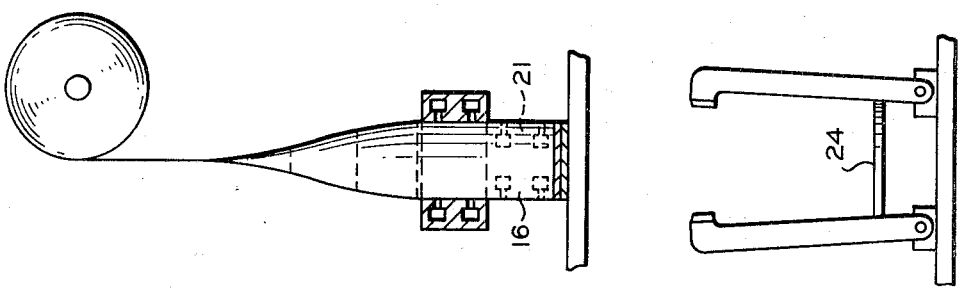
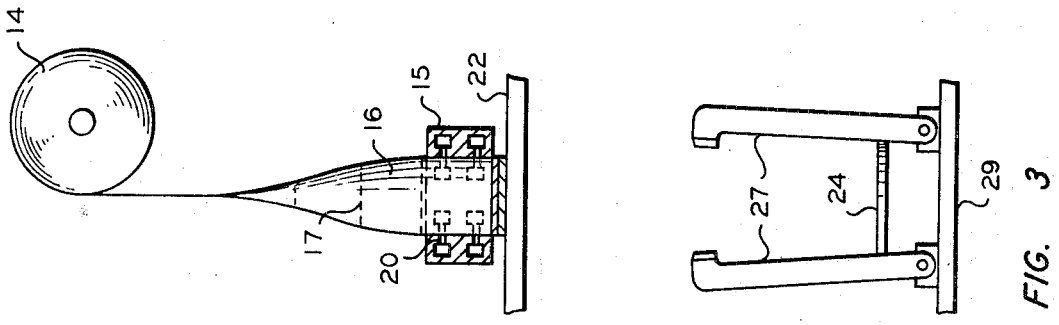

INVENTORS
A. B. GALVANONI
L. M. FARLEY
C. W. OSMOND

BY Young & Quigg

ATTORNEYS

United States Patent Office 3,551,258
Patented Dec. 29, 1970

3,551,258
LABEL APPLYING APPARATUS
Aldo B. Galvanoni, Charles W. Osmond, and Lloyd M. Farley, Cincinnati, Ohio, assignors to Phillips Petroleum Company, a corporation of Delaware
Filed Mar. 21, 1969, Ser. No. 809,199
Int. Cl. B32b 31/02; B65c 3/26
U.S. Cl. 156—556                                    7 Claims

ABSTRACT OF THE DISCLOSURE

A tubing of film is fed to a vacuum ring which spreads the tubing, and a mandrel is moved into the spread tubing. The mandrel is then withdrawn with a section of the tubing. A container is moved into alignment with the mandrel, and the tubing section is transferred from the mandrel to the container. The tubing section forms a label on the container.

---

Extensive use has been made in recent years of plastic containers as replacements for conventional glass or metal containers. Because of difficulties encountered in printing on many plastic materials on a moving conveyor, labels are often used to provide product identification. The use of labels also eliminates the need for preprinting the containers, thereby permitting more versatile packing operations. However, it is often difficult to secure labels to plastic materials because of the smooth finish of the plastic. In order to solve these problems, it has been proposed to shape the bottles with a central recess to receive a label which is formed of a material which has a certain degree of elasticity. The label can be stretched over the bottle to occupy the region of the recess. The recess serves to hold the label in place and to protect the label from scuffing. While labeling procedures of this type have met with commercial success, there is a need for apparatus which is capable of applying these labels automatically at a high rate of speed. This invention provides apparatus to meet this need.

In accordance with this invention, product identification is printed on a tubing of material which has a certain degree of elasticity. The tubing is inserted in a vacuum ring which serves to open a section of the tubing which subsequently forms the label when detached from the tubing. A movable mandrel is inserted inside the expanded tubing section, and the section is transferred to the mandrel when a vacuum is drawn on the mandrel. The container which is to receive the label is then moved into engagement with the end of the mandrel, and the label is subsequently transferred from the mandrel to the container. The apparatus of this invention is capable of performing these operations automatically at a high rate of speed.

Figure 1:
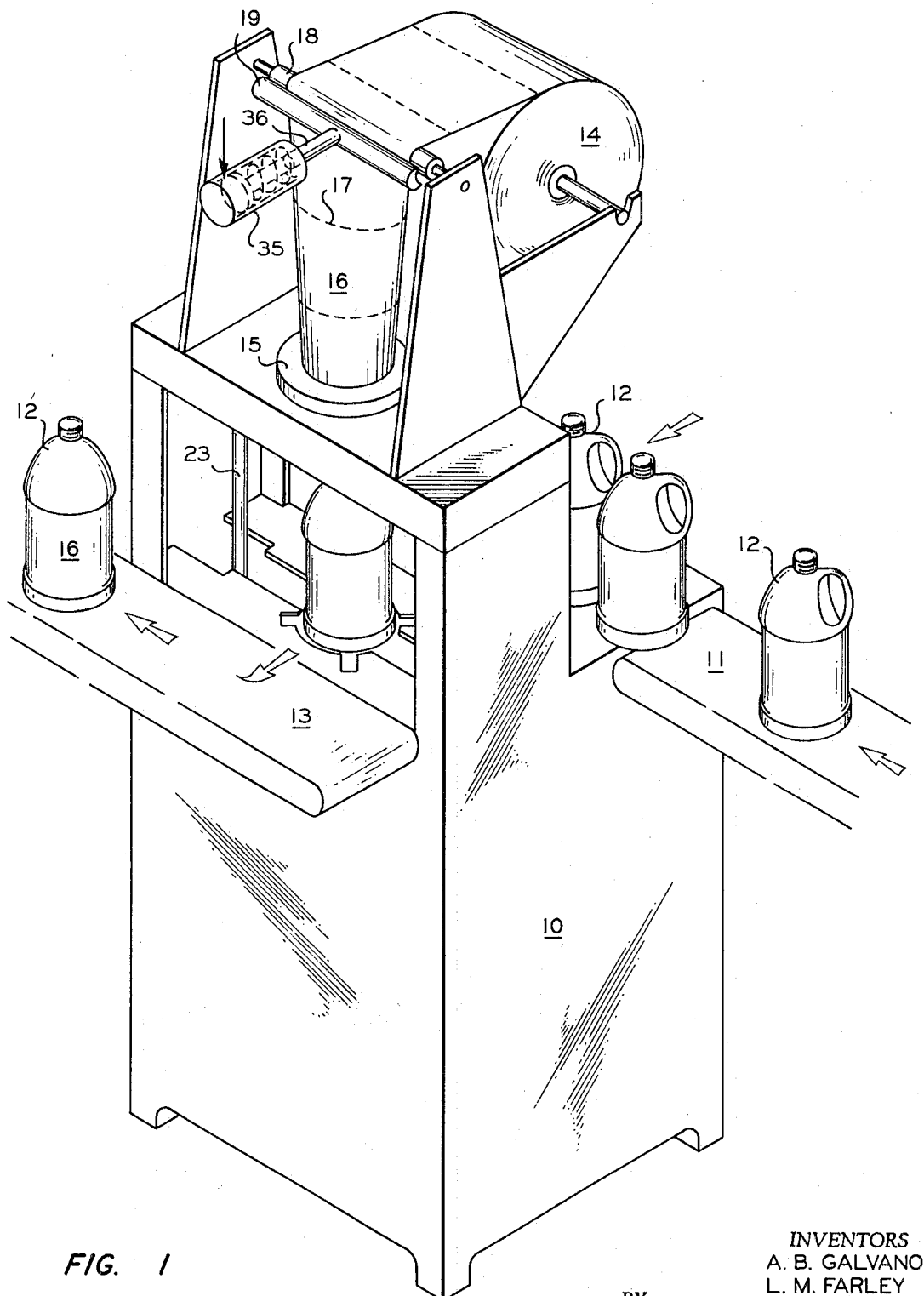
Figure 2:
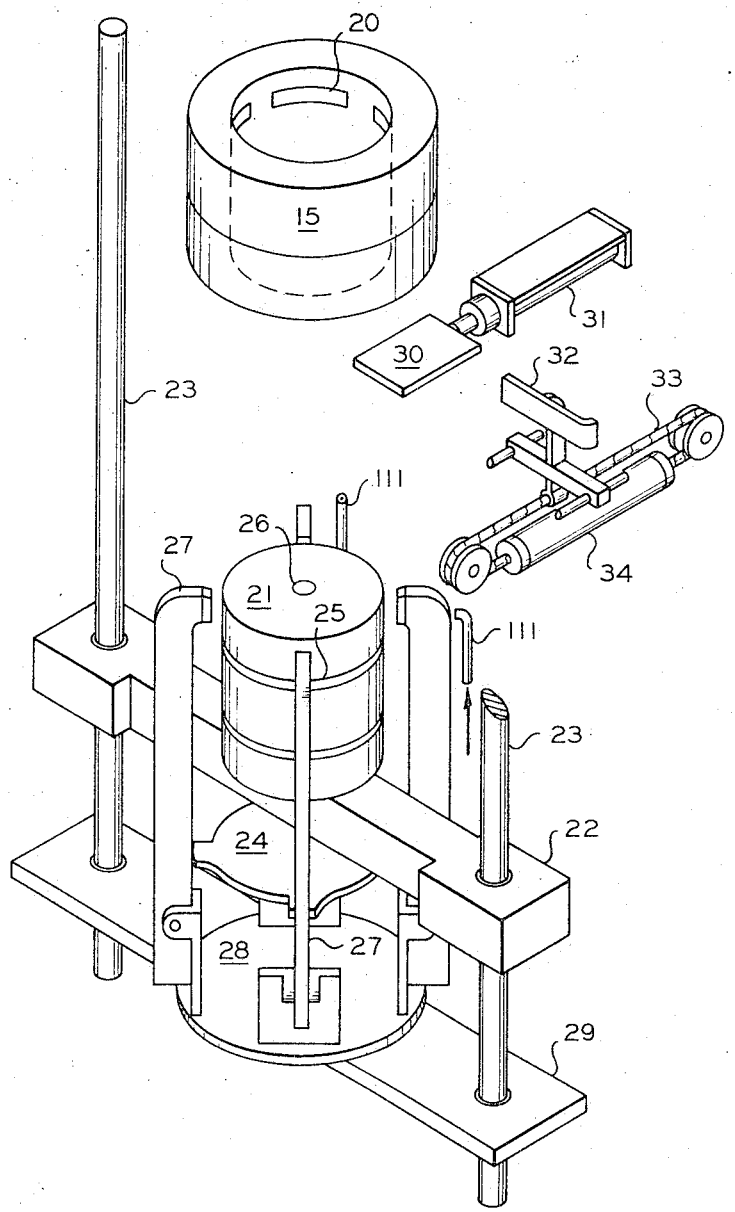
Figure 7:
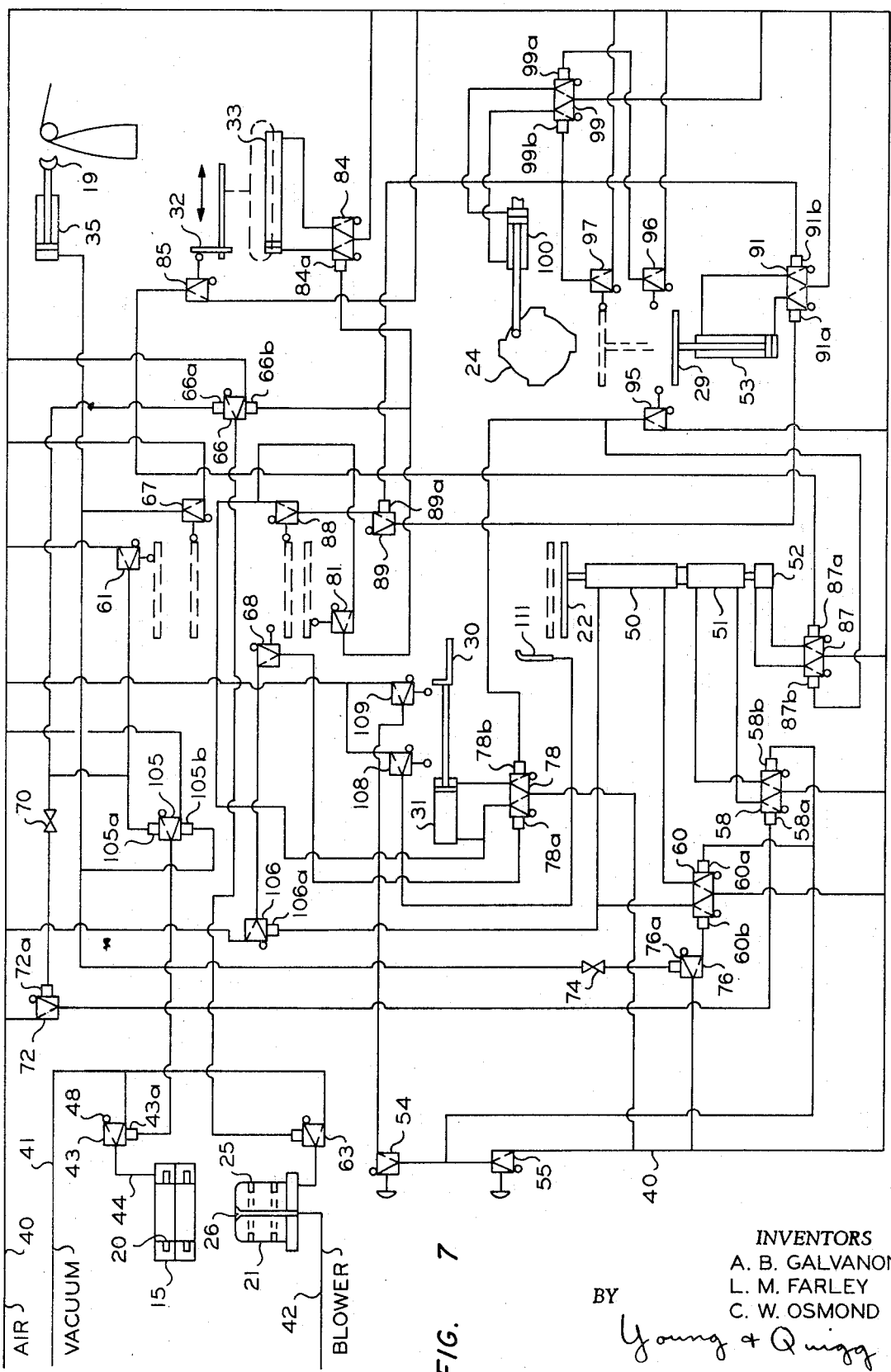

In the drawing, FIG. 1 is a perspective view of an embodiment of the label applying apparatus of this invention. FIG. 2 illustrates certain features of the operating mechanism of the apparatus of FIG. 1. FIGS. 3 to 6 illustrate the sequence of operation of the mechanism of FIG. 2. FIG. 7 is a schematic view of control equipment employed to activate the mechanism of FIG. 2.

Referring now to the drawing in detail, there is shown a housing 10 which supports the label applying mechanism. A conveyor 11 is positioned adjacent housing 10 to deliver containers 12 to the label applying mechanism. A second conveyor 13 removes the containers after the labels have been applied. The individual labels are supplied from a roll of tubing 14 which is supported on housing 10 to deliver the tubing to a vacuum ring 15 in the top of the housing. The tubing extends over a roll 18 which is adapted to be engaged by a locking bar 19. Bar 19 is connected to a cylinder 35 by a rod 36. As is described in detail hereinafter, the application of pneumatic pressure to cylinder 35 moves bar 19 forward to lock the tubing in place. The roll of tubing comprises a plurality of film segments 16 which form the individual labels for the containers. The roll of tubing can be provided with perforations 17 between the individual segments to permit the segments to be separated, as described hereinafter in greater detail. The individual segments of the film can be printed initially with the desired product identification for the containers.

The label applying mechanism supported by housing 10 is illustrated in FIG. 2. Vacuum ring 15 is provided with a series of interior slots 20 which are connected to a vacuum source, not shown in FIG. 2, so that the tubing is opened and held into engagement with the interior wall of the vacuum ring when vacuum is applied. A mandrel 21 is secured to a movable platen 22 which is free to move up and down guide rods 23. Mandrel 21 is provided with interior passages to permit connection to pneumatic pressure and vacuum sources. Mandrel 21 is provided with external recesses 25 and a central top opening 26 which are connected to the interior vacuum and pressure passages, respectively. A plurality of label transfer arms 27 are pivotally secured to a support plate 28 which is mounted on a movable platen 29. Platen 29 is free to move up and down guide rods 23. Transfer arms 27 move into engagement with a label carried by mandrel 21 when the arms are actuated by a cam 24 being rotated in the manner to be described. Suitable springs, not shown, are provided to retain arms 27 in engagement with cam 24.

A movable clamping plate 30 is actuated by a piston 31 which is located such that the clamping plate can be moved to a position between vacuum ring 15 and mandrel 21. A sweep bar 32 is attached to a cable 33 which is actuated by an air cylinder 34. Sweep bar 32 serves to move the incoming containers into alignment with vacuum ring 15 and mandrel 21.

The operation of the apparatus of this invention is illustrated schematically in FIGS. 3 to 6. At the start of the cycle, the mandrel is in an elevated position inside vacuum ring 15, as illustrated in FIG. 3. The lower end of film 14 is disposed between these two elements. A vacuum is applied to slots 20 of the vacuum ring to exert a force which holds the film in an expanded position within the vacuum ring as air is blown from opening 26 to billow the film tube. In the next step of the cycle, a vacuum is applied to the interior of mandrel 21, the vacuum is removed from ring 15, and the air to opening 26 is cut off. This serves to transfer the film from the vacuum ring to the mandrel. Mandrel 21 is then lowered to the position illustrated in FIG. 4. This results in a length of the film corresponding to an individual label 16 being withdrawn from vacuum ring 15. A vacuum is once again applied to ring 15 to secure the next section of the film to the ring. Locking bar 19 is moved into engagement with the film. Mandrel 21 is then lowered further to tear the withdrawn segment of the film from the tubing and thereby remove one label. Although this is accomplished by means of perforations 17 between the film segments, a cutting blade can be employed for this purpose if desired. On lowering mandrel 21 the air to opening 26 is cut off.

Mandrel 21 is lowered to the position illustrated in FIG. 5 and sweep bar 32 of FIG. 2 is actuated to move a container onto the top of the mandrel. Suitable guide means, not shown, can be provided to assure that the container is properly aligned on the top of the mandrel. Clamping plate 30 is then moved to a position above the mandrel to exert a restraining force to prevent the container from being elevated. In the final sequence of steps, arms 27 are pivoted to move into engagement with the label 16 which surrounds mandrel 21. Platen 29 is then elevated so that arms 27 move upwardly to displace the label from the mandrel onto container 12. At this same time, air pressure is supplied to the interior of the mandrel to flow outwardly through top opening 26. This flow of air assists in displacing the label from the mandrel and provides a lubricating effect as the label is transferred upwardly to the container. The container is then moved to conveyor 13 of FIG. 1 and a new cycle is begun.

The control mechanism employed to carry out the sequence of operations described above is illustrated schematically in FIG. 7. This control mechanism is pneumatically operated from a source of air under pressure which is introduced through a conduit 40. A conduit 41 is connected to a vacuum source to supply vacuum to ring 15 and mandrel 21. A conduit 42 is connected to a blower which supplies air to the interior passage 26 of mandrel 21. The control mechanism of FIG. 7 employs a number of pneumatically operated switches, such as switch 43, for example. As illustrated, switch 43 connects conduit 41 to a conduit 44 in the absence of pneumatic pressure being supplied to an actuator 43a. When pressure is supplied to actuator 43a, conduit 44 is connected to a vent port 48. The remainder of the other pneumatically operated switches of FIG. 7 operate in the same general manner. However, some of the switches are provided with two actuators. Several of the switches of FIG. 7 are mechanically actuated, as illustrated.

Platen 22, which carries mandrel 21, is actuated by a series of three cylinders 50, 51 and 52. The lowermost cylinder 52 is secured to housing 10 and supports cylinders 51 and 50. When pneumatic pressure is applied to the lower side of the piston in cylinder 52, cylinders 51 and 50 are both raised. Similarly, when pneumatic pressure is applied to the lower side of the piston in cylinder 51, cylinder 50 is raised. When pneumatic pressure is applied to the lower side of the piston in cylinder 50, platen 22 and mandrel 21 are raised. Thus, all three cylinders are connected in cascade to control the elevation of mandrel 21 and platen 22. Platen 29 is raised and lowered by a pneumatic cylinder 53.

The control mechanism of FIG. 7 is provided with two manually operated switches 54 and 55. For automatic operation, switch 54 is closed and switch 55 is actuated momentarily so that pneumatic pressure is applied from conduit 40 through switch 55 to actuator 58b of switch 58 and to actuator 60a of switch 60. This applies pneumatic pressure from conduit 40 to the lower side of the pistons of cylinders 50 and 51 to raise platen 22 to lift mandrel 21 into vacuum ring 15, as illustrated in FIG. 3. When platen 22 reaches this position, a mechanically operated switch 61 is actuated to apply pneumatic pressure to actuator 105a of switch 105, to actuator 66a of switch 66, and through a restrictor 70 to the actuator 72a of switch 72. Restrictor 70 and the volume of the connecting conduit function as a pneumatic delay means to provide a slight delay before switch 72 is closed. The application of pressure to actuator 105a removes the vacuum which previously was applied to vacuum ring 15. The application of pressure to actuator 66a applies vacuum to mandrel 21. Actuation of switch 72 applies pressure to the second actuator 58a of switch 58. This applies pressure to the top of the piston in cylinder 51, which serves to lower platen 22 and mandrel 21 one label length to the position illustrated in FIG. 4. The lowering of platen 22 actuates mechanical switch 67 near the end of the movement to apply pneumatic pressure to actuator 105b of switch 105. This serves to connect vacuum source 41 to vacuum ring 15. Closure of switch 67 applies pneumatic pressure to cylinder 35 to move lock bar 19 into engagement with tubing 14. Closure of switch 67 also applies pneumatic pressure through restrictor 74 to actuator 76a of switch 76. This serves to apply pressure to actuator 60b of switch 60 to apply pressure to the top of cylinder 50 and to the actautor 106a of switch 106 to close switch 106. The application of pressure to the top of cylinder 50 lowers platen 22 an additional amount to tear the label from the film supply and moves the mandrel to a lower position to receive a container 12.

The downward movement of platen 22 momentarily actuates switch 68. Since switch 106 is closed at this time, pressure is applied to actuator 78a of switch 78. This applies pneumatic pressure to cylinder 31 to move clamp 30 into the region above mandrel 21, as illustrated in FIG. 5. When platen 22 reaches its lowermost position resulting from actuation of cylinder 50, a mechanical switch 81 is actuated. This transmits pressure to actuator 66b of switch 66 to remove vacuum from mandrel 21. At the same time, pressure is applied to actuator 84a of switch 84. This causes switch 84 to apply pneumatic pressure to cylinder 34 to move sweep bar 32 and thereby transfer a container 12 into the label applying region. Sweep bar 32 actuates a switch 85 at the end of its movement to apply pneumatic pressure to actuator 87a of switch 87. This applies pressure to the lower side of the piston in cylinder 52 so as to raise platen 22 a small distance and thereby move the container into engagement with clamping plate 30. This serves to secure the container in a rigid position to receive the label. The upward movement of platen 22 deactuates switch 81, which removes pressure from actuator 84a of switch 84. Switch 84 is provided with a spring return so that pressure is applied to the opposite side of cylinder 34 to return sweep bar 32 to its outward position to receive a second container during the following cycle. The upward movement of platen 22 resulting from the actuation of cylinder 52 actuates switch 88 so that pneumatic pressure is transmitted through switch 89 to actuator 91a of switch 91 which serves to apply pressure to the lower side of cylinder 53 to move platen 29 upwardly. Movement of platen 29 actuates switches 95, 96 and 97 in sequence. Closure of switch 95 applies pressure to actuator 78b of switch 78 to apply pressure to the right side of cylinder 31 to move clamp 30. Closure of switch 96 applies pressure to actuator 99a of switch 90 to apply pneumatic pressure to the right side of cylinder 100 which rotates cam 24. This serves to move arms 27 together to the position illustrated in FIG. 6. Thus, arms 27 grip the label and slide it upwardly during continued upward movement of platen 29.

When platen 29 reaches the top of its stroke, switch 97 is actuated to apply pneumatic pressure to actuator 99b of switch 99. This serves to apply pneumatic pressure to the left side of cylinder 100 to rotate cam 24 back to its initial position. This moves arms 22 back to the open positions illustrated in FIGS. 3 to 5. Actuation of switch 97 also applies pressure to actuator 91b of switch 91 which serves to apply pressure to the top of cylinder 53 to lower platen 29. As platen 29 moves downwardly, switch 95 is closed momentarily so that pneumatic pressure is applied to actuator 87b of switch 87 to reverse the flow of air to cylinder 52 and thereby lower platen 22 and move container 12 out of engagement with clamping plate 30.

As clamping plate 30 nears the end of its return stroke, switch 108 is closed momentarily to supply pneumatic pressure to one or more jet nozzles 111. As illustrated in FIG. 2, nozzles 111 are positioned to apply a pneumatic pressure to displace a container 12 from beneath vacuum ring 15 to removal conveyor 13 of FIG. 1. Retraction of clamping plate 30 also trips switch 109 to start the next cycle.

If only a single cycle of operation is desired, this can be accomplished by leaving switch 54 open and momentarily closing switch 55.

While this invention has been described in conjunction with a presently preferred embodiment, it obviously is not limited thereto.

What is claimed is:

1. Label applying apparatus comprising:
   a vacuum ring adapted to receive a tubing and to spread the tubing when vacuum is applied to the ring,
   a mandrel having a passage therein to permit application of vacuum and pressure to the external surface of the mandrel, means to move said mandrel into said vacuum ring to receive a section of tubing on the external surface thereof and to withdraw the mandrel from the vacuum ring, means to move a container into alignment with said mandrel, and means to slide a tubing section from said mandrel onto the container to form a label on the container.

2. The apparatus of claim 1, further comprising a vacuum source, means to connect said vacuum source selectively to said vacuum ring and to said passage in said mandrel, a pressure source, and means to apply said pressure source selectively to said passage in said mandrel.

3. The apparatus of claim 2, further comprising means to control the operation of said apparatus in sequence to (1) apply said vacuum source to said vacuum ring to hold a section of tubing inside said vacuum ring, (2) move said mandrel into said vacuum ring, (3) remove said vacuum source from said vacuum ring and apply said vacuum source to said mandrel, (4) withdraw said mandrel from said vacuum ring, (5) move a container into alignment with said mandrel, (6) remove said vacuum source from said mandrel, and (7) actuate said means to slide tubing from said mandrel onto said container.

4. The apparatus of claim 3, further comprising means to apply said vacuum source to said vacuum ring after said mandrel has been withdrawn from said ring so that a tubing section is severed from said tubing.

5. The apparatus of claim 1 wherein said means to move a container comprises a sweep bar to move a container into engagement with the end of said mandrel, and a clamping plate to move into engagement with the end of said container which is remote from said mandrel so that said container is held between said mandrel and said clamping plate.

6. The apparatus of claim 1 wherein said means to slide a tubing section comprises a plurality of arms, means to move said arms into engagement with a tubing section on said mandrel, and means to move said arms longitudinally of said mandrel to slide the tubing section from said mandrel onto the container.

7. The apparatus of claim 6, further comprising means to connect a source of pressure to said passage in said mandrel to apply a pressure to the inner surface of the tubing section to assist in the transfer of the tubing section from said mandrel onto the container.

References Cited

UNITED STATES PATENTS

| | | | |
|---|---|---|---|
| 2,579,458 | 12/1951 | Allen et al. | 53—291X |
| 2,860,468 | 11/1958 | Aguilar et al. | 53—291 |
| 2,976,661 | 3/1961 | Bagnelle | 53—292 |
| 3,184,357 | 5/1965 | Kaspar | 156—287X |

BENJAMIN A. BORCHELT, Primary Examiner

J. M. HANLEY, Assistant Examiner

U.S. Cl. X.R.

53—291; 156—287, 494